US011000053B2

(12) United States Patent
Larsson

(10) Patent No.: US 11,000,053 B2
(45) Date of Patent: May 11, 2021

(54) FLUIDIZED BED FREEZER WITH HEATED INLET

(71) Applicant: Octofrost AB, Malmo (SE)

(72) Inventor: Rasmus Larsson, Lomma (SE)

(73) Assignee: Octofrost AB, Malmo (SE)

(*) Notice: Subject to any disclaimer, the term of this patent is extended or adjusted under 35 U.S.C. 154(b) by 369 days.

(21) Appl. No.: 16/305,390

(22) PCT Filed: May 31, 2017

(86) PCT No.: PCT/SE2017/050578
§ 371 (c)(1),
(2) Date: Nov. 29, 2018

(87) PCT Pub. No.: WO2017/209683
PCT Pub. Date: Dec. 7, 2017

(65) Prior Publication Data
US 2020/0315222 A1 Oct. 8, 2020

(30) Foreign Application Priority Data
May 31, 2016 (SE) .................................. 1650763-4

(51) Int. Cl.
F25D 3/11 (2006.01)
A23L 3/36 (2006.01)
(Continued)

(52) U.S. Cl.
CPC ................ *A23L 3/361* (2013.01); *F25D 3/11* (2013.01); *F25D 13/067* (2013.01); *F25D 25/04* (2013.01);
(Continued)

(58) Field of Classification Search
CPC .......... F25D 3/11; F25D 13/067; F25D 25/04; F25D 2400/02; F25D 2400/30; F25D 13/062; A23L 3/361
See application file for complete search history.

(56) References Cited

U.S. PATENT DOCUMENTS 3,169,381 A 2/1965 Persson
4,062,202 A 12/1977 Cloudy
(Continued)

FOREIGN PATENT DOCUMENTS

BE 896305 A 7/1983
CN 103791671 B 12/2015
(Continued)

OTHER PUBLICATIONS

European Patent Office, Extended European Search Report for Application No. 17807115.5-1009/3462909 (PCT/SE2017050578), dated May 23, 2019, pp. 1-4.

*Primary Examiner* — David J Teitelbaum
(74) *Attorney, Agent, or Firm* — Pablo Meles

(57) ABSTRACT

A refrigerator or freezer device at a refrigerator or freezer (1) having, a house (3), fan devices (4), refrigeration or freezing aggregates (5), a perforated trough bottom assembly (2), an inlet (6) and an outlet (7) where the perforated trough bottom assembly (2) can include a first perforated trough bottom part (2*b*) and a second perforated trough bottom part (2*a*), where the first part and second part are subjected to the action of the fan devices (4) and the refrigeration or freezing aggregates (5) and the first part (2*b*) of said perforated trough bottom assembly (2) next to the inlet (6) is heated so that food materials are prevented from being stuck to the perforated trough bottom assembly (2).

9 Claims, 2 Drawing Sheets

(51) Int. Cl.
    *F25D 13/06*    (2006.01)
    *F25D 25/04*    (2006.01)
(52) U.S. Cl.
    CPC ...... *F25D 2400/02* (2013.01); *F25D 2400/30* (2013.01)

(56) References Cited

U.S. PATENT DOCUMENTS

| | | | |
|---|---|---|---|
| 6,477,845 B1 | 11/2002 | Larsson | |
| 2014/0069124 A1* | 3/2014 | Chang | F25D 13/067 62/63 |
| 2015/0369524 A1* | 12/2015 | Ikegami | F24F 3/1411 165/61 |
| 2018/0186574 A1* | 7/2018 | Teilmann | A22C 25/06 |

FOREIGN PATENT DOCUMENTS

| | | | | |
|---|---|---|---|---|
| GB | 731749 A | | 6/1955 | |
| GB | 759663 A | | 10/1956 | |
| GB | 974824 A | * | 11/1964 | ........... F25D 13/067 |
| GB | 1042080 A | | 9/1966 | |

\* cited by examiner

FLUIDIZED BED FREEZER WITH HEATED INLET

CROSS-REFERENCE TO RELATED APPLICATIONS

This application is related to and is a national stage application from PCT International Application No. PCT/SE2017/050578 filed on May 31, 2017 and is further related to and claims priority to Sweden application No. SE 1650763-4 filed on May 31, 2016, the entire content of which are both incorporated herein by reference

TECHNICAL FIELD

The present invention relates to a refrigeration or freezer device having a fluidized bed freezer with heated inlet.

TECHNICAL BACKGROUND AND PRIOR ART

It is a known problem that whenever introducing food material in a continuously running freezer there are challenges with warm products sticking to cold surfaces. Especially the perforated trough bottom or conveyor carrying and transporting the food in a partly or semi-fluidized bed freezer tends to clog with pieces of foodstuff, ice and snow. This limits the time between defrosting of the freezer and also decreases the freezing result resulting in pieces of food being stuck together.

In U.S. Pat. No. 4,062,202 a freezer is described in which the tendency of sticking together of food material, as e.g. French fries or peas, on the mesh belt food conveyor is prevented by introducing hot air into an internal duct in the food weir. This arrangement is complicated as it first of all necessitates a food weir and moreover must feed hot air into the weir. The food can nevertheless stick to the mesh belt food convelyor in spite of the heated food weir which implies that the conveyor must be cleaned often. An object of the invention is to provide a refrigeration or freezer device, which eliminates the above described problems. The object is achieved with the refrigeration or freezer device according to claim 1.

Preferred embodiments of the refrigeration or freezer device have been given the characterizing features which appears in the sub claims.

The refrigeration or freezer device according to the embodiments comprises substantially less loose parts than corresponding known freezers which are provided with arrangements to avoid sticking of food material.

The embodiments of the invention focus on avoiding any foodstuff, ice or snow sticking to the trough rather than mechanically removing what has already accumulated.

The refrigeration or freezer according to the embodiments is furthermore easy to manufacture industrially and is also very effective in use.

BRIEF DESCRIPTION OF THE DRAWINGS

The embodiments are described in the following with reference to the attached drawings, which show a preferred embodiment. Note that the figures are schematic and that details thereby can be left out therefrom.

DETAILED DESCRIPTION

Details, which refer to substantially alike parts of the different embodiments, have been given the same reference numbers.

Figure 1:
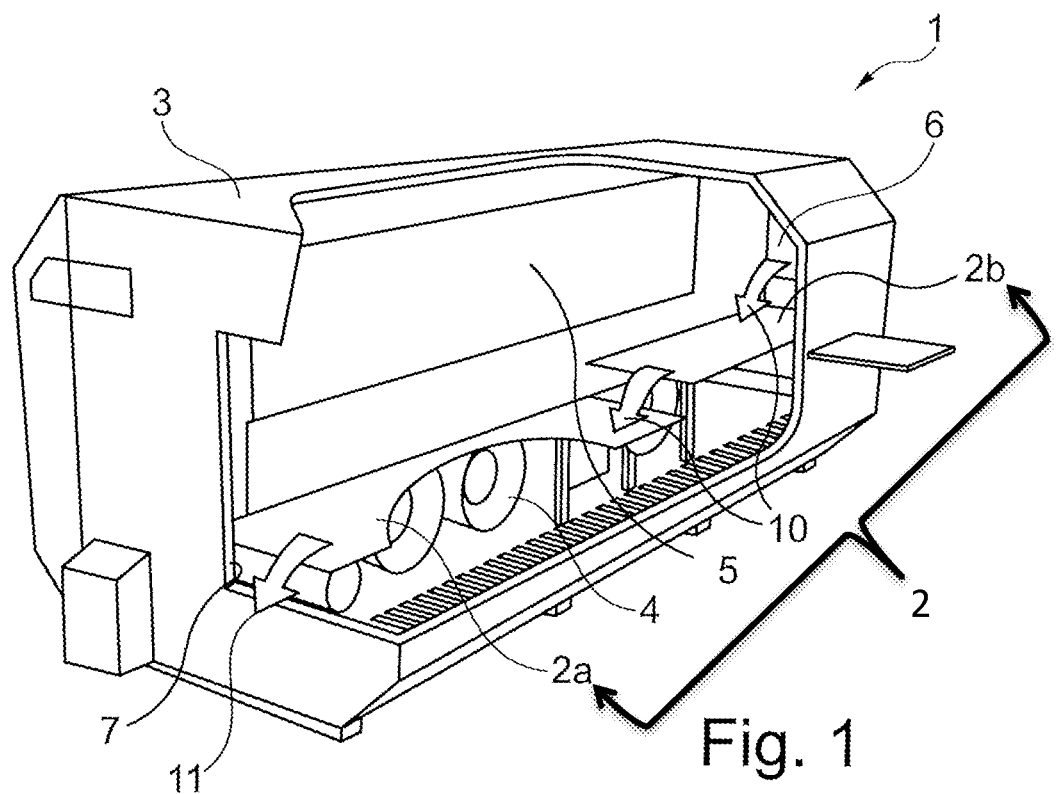
FIG. 1 shows schematically a perspective view of a refrigerator or a freezer with a refrigeration or freezer device according to the embodiments.
Figure 2:
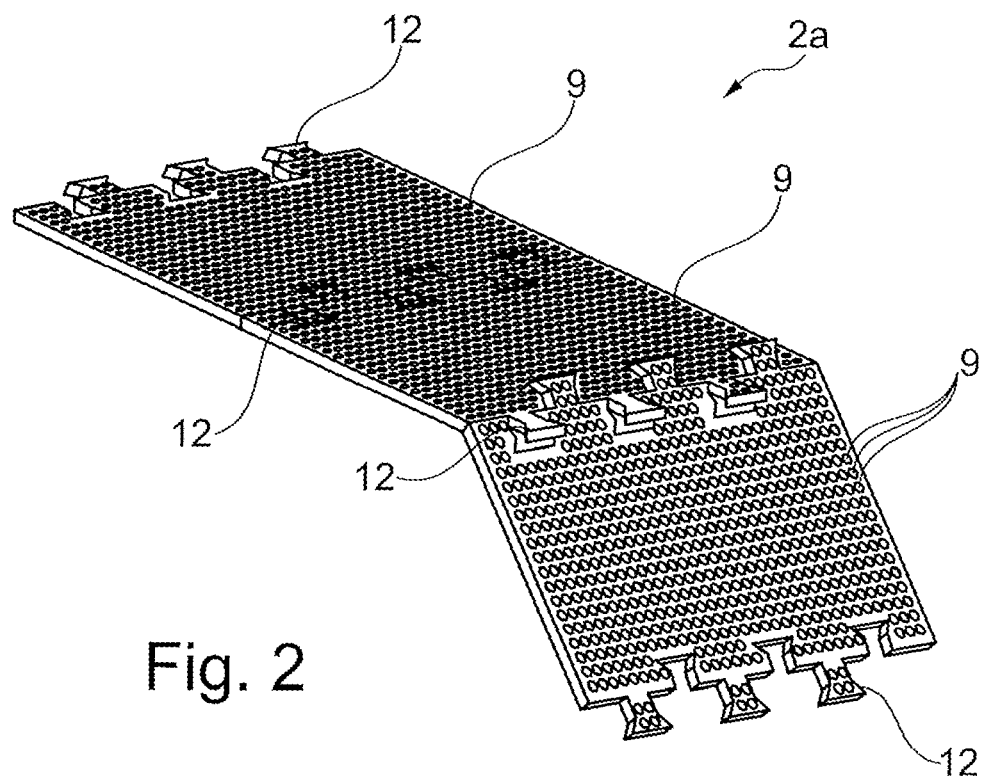
FIG. 2 shows a perspective view of a part of the perforated trough in the refrigerator or freezer of FIG. 1.
Figure 3:
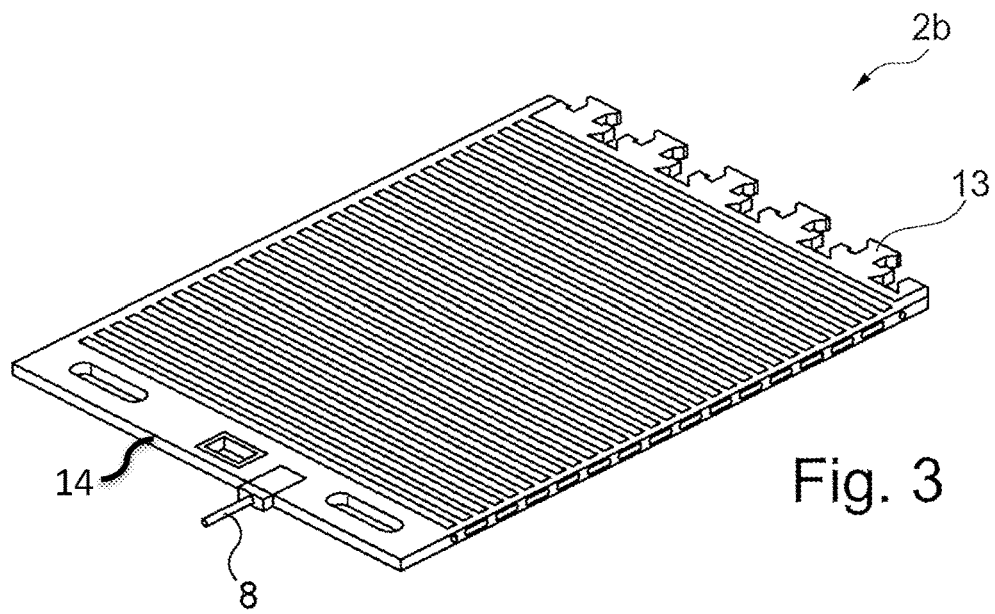
FIG. 3 shows a part of the refrigerator or freezer device according to the embodiments.
Figure 4:
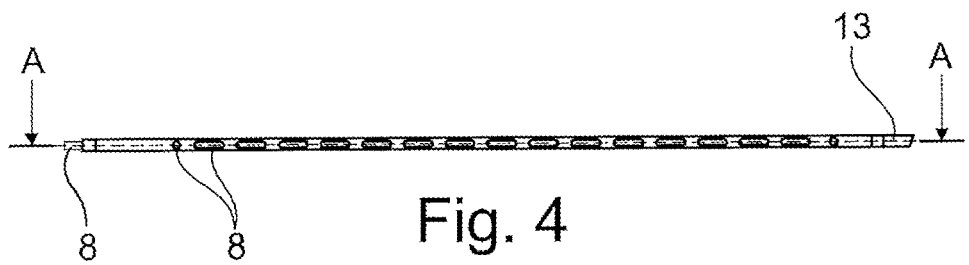
FIG. 4 shows a side view of the refrigerator or freezer device according to the embodiments.
Figure 5:
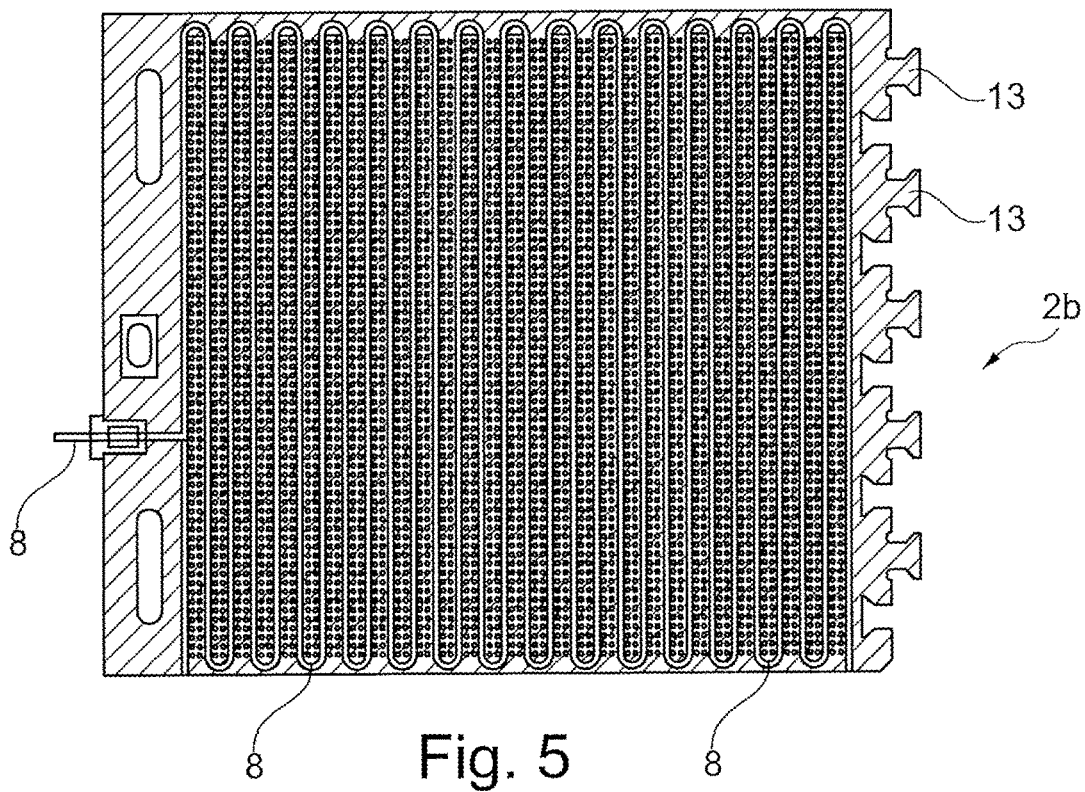
FIG. 5 shows a section after line A-A of the refrigerator or freezer device according to the embodiments.

With reference to the drawings in FIG. 1 is shown a refrigerator or freezer 1 for refrigeration or freezing treatment and transportation of a material, consisting of piece goods or granules of solid material. The refrigerator or freezer 1 comprises a perforated trough bottom 2 which is divided into two parts 2a and 2b, wherein the part 2b is preferably the refrigerator or freezer device according to the embodiments. The refrigerator or freezer furthermore comprises a house 3, fan devices 4 and refrigerator or freezing aggregates 5. Moreover, the refrigerator or freezer 1 is provided with an inlet 6 and an outlet 7. The inlet trough part 2b comprises a heated trough bottom which is provided with electrical heating cables 8 in a zigzag pattern, as shown in FIGS. 3 to 5.

The trough bottom parts 2a and 2b are perforated having holes 9 spread over their surfaces. The transportation of the product, as food material, is shown by arrows 10 and 11. 12 and 13 denotes coupling elements to join several portions of the trough bottom 2 together. At the end of each path part 2a or 2b are portions of the trough bottoms with a coupling on only one side and where the other side is without coupling as the side 14 illustrated in FIG. 3.

As shown in the drawings two or more portions of the trough bottom, the bottom 2a as well as the bottom 2b, can be coupled together to form a longitudinal path through the refrigerator or freezer 1. The trough portion 2b is situated on a higher level than the trough portion 2a so that food material entering into the inlet 6 will first be transported along the trough portion 2b and thereafter fall down on the trough portion 2a and finally be transported to the outlet 7 and out from the refrigerator or freezer.

By heating the first part 2b of the trough bottom 2 the food material is prevented from being stuck to the trough bottom part 2b which makes the refrigerator or freezer more efficient.

The transportation of the food material is performed preferably by achieving a semi-fluidized refrigerator or freezer, i.e. the fan devices 4 blowing air from the refrigerating or freezing elements through the perforated troughs 2a and 2b so that only a part of the food material is in contact with the trough bottom, whereby the trough bottom parts 2a and 2b are subjected to an asymmetric vibration movement to facilitate the transportation.

Of course the refrigerator or freezer device according to the embodiments can be provide with a perforated transport band or a fully fluidized refrigerator or freezer, i.e. a refrigerator or freezer which transports the food material on a perforated transport band moving only in one direction.

Hence, the embodiments are related to a refrigerator or freezer 1 of the kind where the product by means of a fan device 4 is fluidized or semi-fluidized (lower energy as part of the products are always in touch with the trough bottoms 2a and 2b) and where the product, as e.g. fruit or vegetables, in small pieces is fed first through the inlet 6 to a part 2b and thereafter is fed further to part 2a and finally out from the refrigerator or freezer through an outlet 7. The product is preferably fed by means of an asymmetric movement in the length direction of the troughs 2a and 2b. The trough bottoms 2a and 2b are provided with through holes 9 for letting the air from the fan devices 4 and the refrigerating or freezing aggregates 5 blow through the holes 9 and lift and freeze, alternatively, the product, see EP 1163048 or WO 00/45949.

One disadvantage is that the product can be clogged and stick to the first trough part 2b due to temperature differences between trough bottoms and product when entering the refrigerator or freezer. This is normally eliminated by vibrations or cleaning of the first trough as well as replacing the first trough part 2b with a new cleaned one.

By heating the first trough bottom part 2b the product will be prevented to stick to the first trough bottom part 2b and by arriving to the second trough bottom part 2a the affect does not exist anymore as the product is already partly or entirely frozen around its periphery. The heating is performed by providing the first trough bottom part 2b or the separate parts of trough bottom part 2b with electrical heating cables 8 for electrical loops or heating liquid for heating the trough part 2b.

The invention is of course not limited to the embodiment described above, but can be modified within the frame of the patent claims.

What is claimed is:

1. Refrigerator or freezer device at a refrigerator or freezer (1) having, a house (3), fan devices (4), refrigeration or freezing aggregates (5), a perforated trough bottom assembly (2), an inlet (6) and an outlet (7), wherein the perforated trough bottom assembly (2) comprises a first perforated trough bottom part (2b) and a second perforated trough bottom part (2a), in that said first part as well as said second part are subjected to the action of the fan devices (4) as well as the refrigeration or freezing aggregates (5) and in that said first part (2b) of said perforated trough bottom assembly (2) next to the inlet (6) is heated so that the food materials are prevented from being stuck to said perforated trough bottom assembly (2) and wherein the perforated trough bottom assembly is heated using one of electrical heating cables or channels for a heating liquid or air.

2. Refrigerator or freezer device according to claim 1, wherein the cables are mounted in a zigzag pattern over portions of the perforated trough bottom assembly.

3. Refrigerator or freezer device according to claim 1, wherein the channels are mounted in a zigzag pattern over portions of the perforated trough bottom assembly.

4. A perforated trough bottom assembly for use with a refrigerator or freezer having, a house, fan devices, refrigeration or freezing aggregates, an inlet and an outlet, the perforated trough bottom assembly comprising:

a first perforated trough bottom part;
a second perforated trough bottom part, wherein the first perforated trough bottom part and the second perforated trough bottom part are subjected to action of the fan devices and the refrigeration or freezing aggregates; and
a heating element configured to heat the first perforated trough bottom part next to the inlet in a manner preventing food materials from being stuck to the perforated trough bottom assembly wherein the perforated trough bottom assembly is heated using one of electrical heating cables, channels for a heating liquid, or channels for air.

5. The perforated trough bottom assembly according to claim 4, wherein the cables are mounted in a zigzag pattern over the perforated trough bottom assembly.

6. The perforated trough bottom assembly according to claim 4, wherein the channels are mounted in a zigzag pattern over the perforated trough bottom assembly.

7. A refrigerator or freezer, the refrigerator or freezer comprising:

a house for housing the refrigerator or freezer;
fan devices housed within the house;
refrigeration or freezing aggregates housed within the house;
an inlet for the refrigerator or freezer;
an outlet for the refrigerator or freezer; and
a perforated trough bottom assembly for use with the refrigerator or freezer, wherein the perforated trough bottom assembly further comprises:
a first perforated trough bottom part;
a second perforated trough bottom part, wherein the first perforated trough bottom part and the second perforated trough bottom part are subjected to action of the fan devices and the refrigeration or freezing aggregates; and
a heating element configured to heat the first perforated trough bottom part next to the inlet in a manner preventing food materials from being stuck to the perforated trough bottom assembly wherein the perforated trough bottom assembly is heated using one of electrical heating cables, channels for a heating liquid, or channels for air.

8. The refrigerator or freezer according to claim 7, wherein the cables are mounted in a zigzag pattern over the perforated trough bottom assembly.

9. The refrigerator or freezer according to claim 7, wherein the channels are mounted in a zigzag pattern over the perforated trough bottom assembly.

* * * * *